No. 825,047. PATENTED JULY 3, 1906.
W. GILLOTT.
COMBINED CULTIVATOR AND HARROW.
APPLICATION FILED APR. 30, 1903.
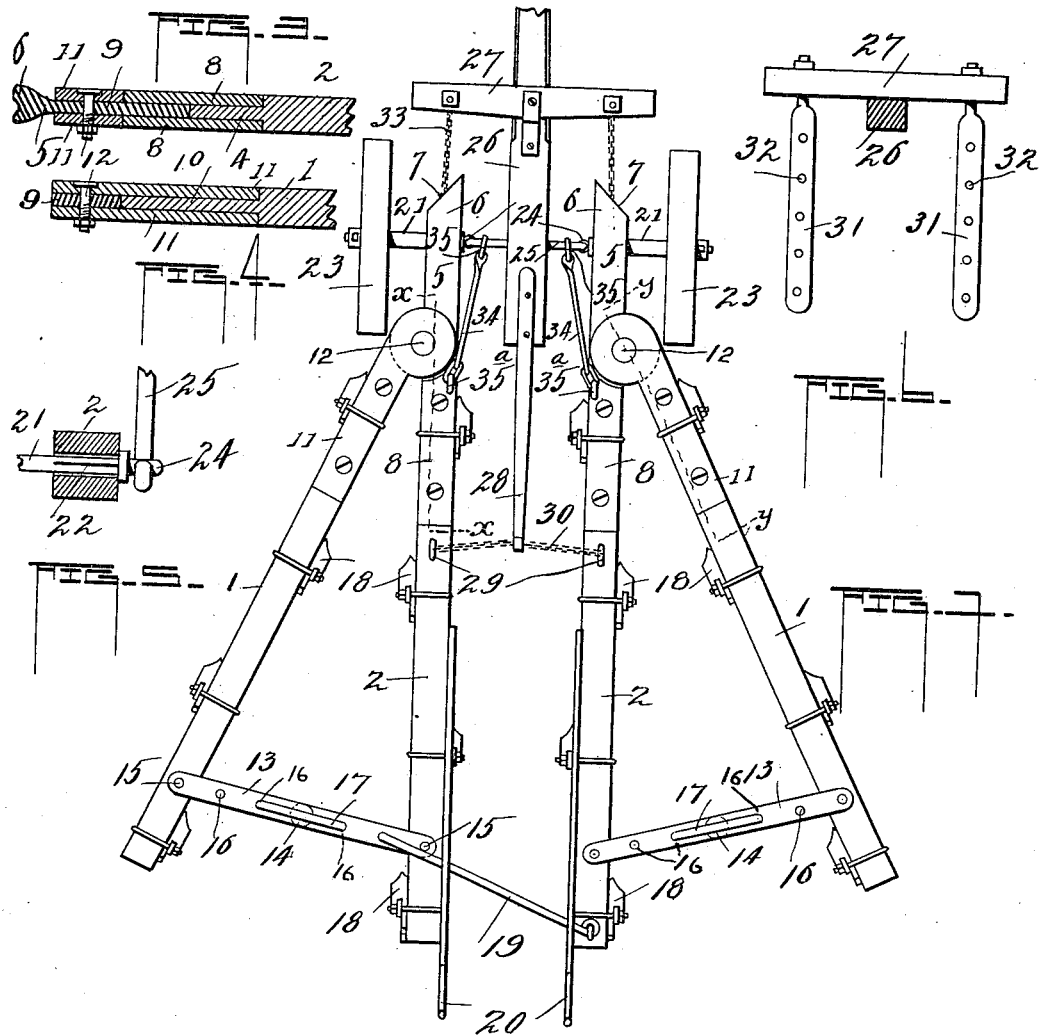
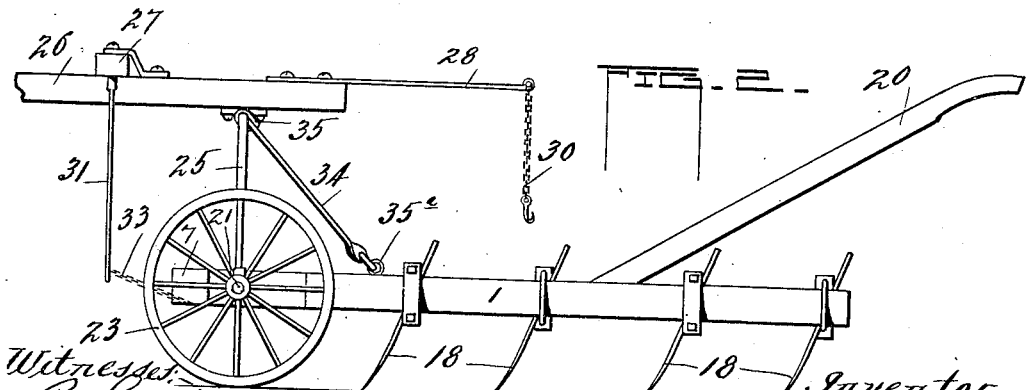

UNITED STATES PATENT OFFICE.

WILLIAM GILLOTT, OF WOLCOTT, ILLINOIS.

COMBINED CULTIVATOR AND HARROW.

No. 825,047.  Specification of Letters Patent.  Patented July 3, 1906.

Application filed April 30, 1903. Serial No. 155,029.

*To all whom it may concern:*

Be it known that I, WILLIAM GILLOTT, a citizen of the United States, residing at Wolcott, in the county of Peoria and State of Illinois, have invented certain new and useful Improvements in a Combined Cultivator and Harrow; and I do hereby declare that the following is a full, clear, and exact description of the invention, which will enable other skilled in the art to which it appertains to make and use the same.

This invention has reference to a combined cultivator and harrow.

The object which I have in view is to provide a cultivator and harrow frame of the A-harrow type, and relates to the mechanism whereby the same may be contracted and widened to suit the different conditions and kinds of plants to be cultivated; and it consists in the various details of construction hereinafter more fully described and claimed in the appended claims, due reference being had to the accompanying drawings, forming a part of this specification, in which—

Figure 1 is a plan view of my improved cultivator and harrow. Fig. 2 is an elevation of one side thereof. Fig. 3 is a cross-section of certain frame parts on the line *x x* of Fig. 1. Fig. 4 is a cross-section of certain frame parts on the line *y y* of Fig. 1. Fig. 5 is a sectional detail view of the universal connection between the arch and the frame. Fig. 6 is a detail view in elevation of certain frame parts.

Like numerals of reference indicate corresponding parts of the figures.

In the present invention it is my aim to construct a machine especially adapted for cultivation between rows of corn and other plants, and the arrangement of the frame parts is such that the cultivating devices may be removed when desired and harrow-teeth substituted to adapt the machine for use as a harrow, and I have provided suitable contrivances for contracting and widening the frame as may be desired and also means for retaining the parts of the cultivator and harrow in adjusted positions.

The machine comprises the frame parts 1 and 2, which together constitute an A-frame, the A-frames being duplicated in the specific instance illustrated in such a manner as to straddle a row and to cultivate between the rows. The construction of the forward ends of the frame parts 1 and 2 is such that in case of a break down of either of the frame parts parts may be substituted at little or no trouble and at very small expense. Referring to the frame part 2, the same has a reduced extension 4, and 5 is a plate extending from the end of the extension 4 and has the outer enlarged portion 6 with diagonally-tapered end portion 7, and 8 represents covering-plates connecting, respectively, with the extension 4 of the frame 2 and the frame part 5 having the bearing portion 9, and referring to the frame part 1 it has a reduced extended portion 10, and 11 represents covering-plates extending beyond the extension 10 and having the enlarged ends adapted to have the bearing portion 9 of the extension 5 placed in between the covering-plates, as shown, and pivoted thereto by means of the pin or bolt 12. At the rear ends of the frame parts 1 and 2 I connect the same by means of the plates or bars 13, which are pivotally connected to each other at 14 and to the frame parts 1 and 2 at 15, and each of the plates has perforations 16, the arrangement being such that the frame parts 1 and 2 may be swung on pivot 12 and separated from each other, and the movement of the plates 13 is such that when thrown so that they are in alinement they limit the movement of the frame parts 1 and 2, and for retaining them in such positions a yoke-pin 17 is provided to be inserted into perforations 16 in the manner shown in Fig. 1, and when contracting the frame parts the yoke is removed, and during such contraction if it is desired to set the frame parts at angles other than that which is illustrated the yoke-pin will be dropped into perforations in position for retaining the frame parts in such adjusted positions.

18 represents cultivator-shovels designed to be attached to the frame parts in the manner shown or by other suitable mechanism and arranged alternately upon opposite sides of the frame, as shown in Fig. 1, and they are so attached to the frame parts that if it is desired to use the machine as a harrow instead of a cultivator harrow-teeth may be attached to the frames in the usual manner.

In the present construction the connection at the forward end of the machine is such that I can move the duplicate culitvating parts toward and from each other and have also provided the connecting-rod 19, designed to be attached to one of the frame parts 2, and when locking the parts, as shown in Fig. 1, the free end of the connecting-rod 19, which has a loop, may be made to engage a perforation 16 in one of the plates 13, in this manner locking the two frames together, and 20 represents handles suitably attached to the frame parts 2 and extending up in position to be grasped by the operator when the machine is in operation for guiding and adjusting the parts.

21 represents short spindles connected with the frame, these spindles having the squared portions 22, which provides a rigid connection for the same in the frame, and on the outer ends thereof are designed to be carried the ground-wheels 23, and the inner ends are looped at 24 for the following purposes.

25 is an arch of suitable height arranged to straddle a row having vertical extensions whose ends have a connection with the loops 24 of the spindle 21 to form a universal joint, and supported by said arch is a pole or beam 26, which carries the doubletree 27 to support swingletrees and has the rear extended portion 28. Referring to the extension 28, I have provided devices 29, carried by the frame parts, which are arranged to be connected by rods or chain connections 30 with the extension 28. This arrangement is such that when moving from place to place the shovels may be raised from the ground by raising the frame parts that they may be attached to the connection 30 through the devices 29 and remain in such position until the release of the connection between the chain 30 and the devices 29, and, referring to the swingletree connection, 31 refers to bars or straps suitably connected with and extending from the doubletree and provided with perforations 32, this arrangement being such that the draft on the frame parts may be varied by connecting the swingletrees with either of the perforations 32, as may be desired, and 33 is an adjustable connection between the bars 31 and the ends of the frame part 6, as shown.

I have provided a rod-and-link connection between the arched frame parts 25 and the parts 2 for the purpose of making rigid connection of the frame parts, and the rods are referred to as 34, connected with the links 35, fast to the arched frame, and at their opposite ends to the links 35ª, connected with suitable devices on the frame parts.

By the provision of the ground-wheels at the forward part of the frames I am enabled, if desired, to take the draft of the cultivator completely off of the horses by raising the rear end of the frame and permitting the same to travel on wheels. When using the machine as a harrow, it is desirable to remove the wheels, and in moving from place to place by provision of the bars 13 I can adjust the frame parts 1 and 2 with relation to each other. The universal connections of the frame with the arch permits me to raise either side of the machine, as desired. By reason of the described construction and the adjustability of parts I am enabled to use the machine for cultivating in almost every conceivable way for straddling the corn and to cultivate the entire ground between the rows.

I am aware that various changes may be made in the construction and the arrangement of parts, and I wish it understood that obvious changes may be resorted to without affecting the principle of the invention herein set forth.

Having thus fully described my invention, what I claim, and desire to secure by Letters Patent of the United States, is—

1. A cultivator comprising two connected and independently movable A-frames, each frame being composed of two frame parts, one frame part of each frame being pivotally connected to the other part of the same frame near the forward end of the latter, relatively adjustable pivotally-connected plates connecting the frame parts of each frame with their rear ends, a spindle mounted in the forward end of one frame part of each frame, a wheel carried by each spindle, an arch connected to each spindle by a universal joint and a pole or beam carried by said arch whereby each A-frame can be given universal movement independently of the beam and of the other frame.

2. In a cultivator the combination of two A-frames, each composed of two frame parts, one frame part of each frame being pivotally connected at its forward end to the other frame part, means for adjustably connecting the frame parts of each frame together at their rear ends, a spindle carried by each frame, a wheel carried by each spindle, an arch connecting said spindles, a beam carried by said arch, a rearwardly-extending portion carried by said beam, flexible connections between said rearwardly-extending portion and the A-frames.

3. In a cultivator the combination with two spindles, an arch pivotally connected to each of said spindles, a beam carried by said arch and wheels carried by said spindles, of two A-frames, each connected to one of the spindles whereby the frames may be separately moved in a vertical direction, each A-frame being composed of two parts, means pivotally connecting the frame parts in the rear of the pivotal connection of the frames with the spindles, means for connecting the frame parts together so that one frame part will be at an angle to the other frame part, and means for connecting the two frames together so as to maintain one frame part of each frame in parallel relation to one frame part of the other frame.

In testimony whereof I affix my signature in presence of two witnesses.

WILLIAM $\overset{\text{his}}{\times}$ GILLOTT.
mark

Witnesses:
 ED WARD GILLOTT,
 ROBERT N. McCORMICK.